US011970040B2

(12) United States Patent
Bruno et al.

(10) Patent No.: US 11,970,040 B2
(45) Date of Patent: Apr. 30, 2024

(54) RECOGNITION OF DEGRADED PERFORMANCE IN A VEHICLE SUSPENSION SYSTEM

(71) Applicant: MARELLI SUSPENSION SYSTEMS ITALY S.P.A., Corbetta (IT)

(72) Inventors: Walter Bruno, Asti (IT); Piero Antonio Conti, Asti (IT); Fabio Cotto, Turin (IT); Giordano Greco, Turin (IT); Simone Marchetti, Pesaro (IT); Marco Di Vittorio, Turin (IT)

(73) Assignee: MARELLI SUSPENSION SYSTEMS ITALY S.p.A., Corbetta (IT)

( * ) Notice: Subject to any disclaimer, the term of this patent is extended or adjusted under 35 U.S.C. 154(b) by 739 days.

(21) Appl. No.: 17/267,423

(22) PCT Filed: Aug. 8, 2019

(86) PCT No.: PCT/IB2019/056763
§ 371 (c)(1),
(2) Date: Feb. 9, 2021

(87) PCT Pub. No.: WO2020/031133
PCT Pub. Date: Feb. 13, 2020

(65) Prior Publication Data
US 2021/0291611 A1    Sep. 23, 2021

(30) Foreign Application Priority Data

Aug. 10, 2018  (IT) .................. 102018000008039

(51) Int. Cl.
*B60G 17/0165*    (2006.01)
*B60G 17/018*    (2006.01)
(Continued)

(52) U.S. Cl.
CPC ..... *B60G 17/0185* (2013.01); *B60G 17/0165* (2013.01); *B60G 17/0182* (2013.01);
(Continued)

(58) Field of Classification Search
CPC ............ B60G 17/0185; B60G 17/0165; B60G 17/0182; B60G 17/01908; B60G 2202/24;
(Continued)

(56) References Cited

U.S. PATENT DOCUMENTS 5,061,932 A * 10/1991  Tribe .................... B60G 17/019
                                                              73/105
2010/0312492 A1* 12/2010  Fryk ........................ G01B 7/34
                                                              73/146
(Continued)

FOREIGN PATENT DOCUMENTS

| DE | 4227470 A1 | 2/1994 |
| FR | 2925680 A1 | 6/2009 |
| WO | 2018021393 A1 | 2/2018 |

OTHER PUBLICATIONS

International Search Report and Written Opinion of the International Searching Authority for PCT International Application No. PCT/IB2019/056763 dated Dec. 5, 2019.

*Primary Examiner* — David J Bolduc
(74) *Attorney, Agent, or Firm* — Howard & Howard Attorneys PLLC (57) ABSTRACT

A method for estimating damping characteristics of shock absorbers in an active or semi-active suspension involves providing a reference model of a nominal relation between a road severity index related to vertical acceleration values, and the mean driving current of the control valves of the shock absorbers, acquiring respective relative acceleration or speed data of at least the front wheels of the vehicle with respect to the vehicle body, determining a value of the road severity index starting from relative acceleration or speed
(Continued)

data of the front wheels of the vehicle with respect to the vehicle body, acquiring values representative of the mean driving current of the control valve of each shock absorber, comparing acquired value of the mean driving current with an expected value of the nominal mean driving current determined as a function of the road severity index according to the reference model, and determining a degradation condition if the acquired value does not correspond to the expected value.

19 Claims, 3 Drawing Sheets

(51) Int. Cl.
    *B60G 17/0185*    (2006.01)
    *B60G 17/019*     (2006.01)
    *G01M 17/04*     (2006.01)

(52) U.S. Cl.
    CPC ....... *B60G 17/01908* (2013.01); *G01M 17/04* (2013.01); *B60G 2202/24* (2013.01); *B60G 2400/102* (2013.01); *B60G 2400/202* (2013.01); *B60G 2400/821* (2013.01); *B60G 2500/11* (2013.01); *B60G 2600/08* (2013.01); *B60G 2600/184* (2013.01); *B60G 2600/60* (2013.01); *B60G 2800/70* (2013.01)

(58) Field of Classification Search
    CPC ........ B60G 2400/102; B60G 2400/202; B60G 2400/821; B60G 2500/11; B60G 2600/08; B60G 2600/184; B60G 2600/60; B60G 2800/70; B60G 2400/252; B60G 2400/90; B60G 2500/10; B60G 2600/02; B60G 2600/044; B60G 2600/084; B60G 2800/80; B60G 2800/802; B60G 17/08; G01M 17/04; G07C 5/006; G07C 5/0808; G07C 5/0816
See application file for complete search history.

(56) References Cited

U.S. PATENT DOCUMENTS

| | | | | |
|---|---|---|---|---|
| 2014/0195112 | A1* | 7/2014 | Lu | B60G 17/015 703/2 |
| 2014/0297119 | A1* | 10/2014 | Giovanardi | B60G 17/016 701/38 |
| 2014/0316637 | A1* | 10/2014 | Rhode | B60G 17/0182 701/29.1 |
| 2017/0032592 | A1 | 2/2017 | Lu et al. | |

* cited by examiner

RECOGNITION OF DEGRADED PERFORMANCE IN A VEHICLE SUSPENSION SYSTEM

CROSS-REFERENCE TO RELATED APPLICATIONS

The present application is a National Stage of International Patent Application No. PCT/IB2019/056763 filed Aug. 8, 2019, which claims priority to and all the benefits of Italian Patent Application No. 102018000008039, filed on Aug. 10, 2018 both of which are hereby expressly incorporated herein by reference in their entirety.

BACKGROUND OF THE INVENTION

1. Field of Invention

The present invention relates generally to active or semi-active suspension systems of a vehicle and, more specifically, to estimation of performance degradation of shock absorbers of an active or semi-active suspension system.

2. Description of Related Art

Adjustable damping shock absorbers varying damping characteristics under control of an electronic control unit to change behavior of a vehicle's suspension system depending, for example, on road surface conditions, vehicle's operation conditions and desired comfort settings, are nowadays increasingly used in the automotive sector.

Vertical movements of a vehicle body, and more generally vertical dynamics of a vehicle, are influenced by road surface conditions and driving maneuvers, such as steering, accelerating, braking and gear shifting.

A semi-active suspension system generally comprises:
adjustable damping shock absorbers, of the type including a pressure chamber containing a damping fluid (oil), a piston sliding inside the pressure chamber, the position of which defines a lower pressure chamber and an upper pressure chamber, a by-pass chamber in communication with the upper pressure chamber through holes for passage of the damping fluid, and a control valve, typically a solenoid valve, arranged to control passage of the damping fluid between the pressure chamber and the by-pass chamber;
sensors adapted to detect relative acceleration or relative movement between the vehicle body and the wheel hubs and accelerations and movements of the vehicle body, arranged at the front and rear axles of the vehicle; and
an electronic processing and control unit, adapted to receive and interpret signals emitted by the sensors, indicative of the vehicle dynamics, and arranged to emit drive signals of the control valves of the system's shock absorbers to track the desired damping characteristics of the shock absorbers to comply with predetermined safety conditions or driving settings.

The control logic of the suspension system is modular, whereby it is controlled according to one of a multitude of predefined control strategies according to detected road surface conditions, lateral dynamics of the vehicle, damping characteristic model set and/or desired by the user, according to predetermined priority rules in view of keeping the vehicle running in a safe condition.

Damping characteristics of shock absorbers are adjusted by the control unit by emitting an electrical driving current signal of the actuator means of the control solenoid valve of the shock absorber, the magnitude of which is typically adjusted according to the pulse width modulation (PWM) technique. Such an adjustment of the driving current of the valve allows the damping force characteristic to be continuously adjusted as a function of the relative travel speed between the wheel assembly and the vehicle body (F/v), for each individual shock absorber. With respect to passive suspension systems, wherein the damping characteristic (F/v) is determined by the mechanical and physical parameters of the shock absorber and the viscosity characteristics of the damping fluid and is represented by a single determined curve whereon the working point of the shock absorber is placed, a semi-active suspension system defines a cloud of working points belonging to different damping curves (F/v) covering a working area between a minimum damping characteristic (corresponding to a perceptible underdamped behavior of the oscillation modes of the suspension) and a maximum damping characteristic (corresponding to a perceptible overdamped behavior of the oscillation modes of the suspension), within which is located an intermediate safety damping curve dependent on the mechanical and physical parameters of the shock absorber and on the viscosity characteristics of the damping fluid and on which the system automatically sets itself in the event of an anomaly in the operation of the control solenoid valve, the so-called fail-safe curve.

During the operating life of a shock absorber, it is desirable to monitor any performance degradation due to deterioration of component parts, for example, the control solenoid valve, gaskets and oil seals, etc., or alterations in the operation of electronic circuits regulating the damping characteristics, such as the excitation or driving circuits of the solenoid valve.

Performance degradation of parts making up the shock absorber with respect to the nominal design/calibration performance or the beginning of the operating life causes a variation of the response (damping characteristic) of the shock absorber, or rather of the relationship between the damping characteristic (F/v) and the driving current of the control solenoid valve. This means that, with the same road surface roughness, the actual mean value of the driving current of the solenoid valve is different from the nominal conditions.

A feedback type suspension system control model (such as the Skyhook model, used in semi-active suspension control systems to control the body and wheel motions in the presence of uneven road surfaces in conditions of rectilinear motion) automatically compensates for the change in operating characteristics of the shock absorbers through an adjustment of the loop gain. A different model that may be selected when the control of the lateral dynamics of the vehicle is a priority, which is of predictive type and not based on feedback from the dynamic behavior of the vehicle, would determine an adjustment of a driving current of the control solenoid valve no longer corresponding to the desired damping characteristic.

A direct measurement of the damping characteristic F/v of a shock absorber as a function of the driving current of the solenoid valve may be carried out exclusively on a bench by making the shock absorber work in extension and compression and by measuring the physical quantities required (shock absorber forces, shock absorber speed and control currents). After installation of the shock absorber on the vehicle, this measurement is no longer possible, as on the vehicle there are no load cells in the shock absorber-body interface able to measure the forces exerted by the shock absorber.

SUMMARY OF THE INVENTION

It is an object of the present invention to provide a method for estimating performance degradation of a shock absorber of an active or semi-active suspension system to adapt in real time the control strategies of the system to the operating current characteristic of the shock absorbers.

According to the present invention, this object is achieved by a system and a method for estimating the damping characteristics of the shock absorbers as described and claimed herein.

Particular embodiments are also described.

Further subject-matter of the present invention is a computer program and a suspension system as claimed.

In summary, the present invention is based on the principle of identifying and continuously updating a road severity index (RSI) from the vertical accelerations measured by the on-board sensors, preferably the accelerometer sensors located at the front wheel hubs, and comparing, during operation of the vehicle, the road severity index with a representative quantity of the magnitude of the driving force, for example, of the driving current, of the control valves of the individual shock absorbers, in particular with values representing the mean driving current of the control valves of the individual shock absorbers, both front and rear, related to the actual driving current according to a predetermined filtering rule, including a first-order filter and a moving average over predetermined time intervals.

The present invention is preferably applied in an operating condition in which a vehicle travels in rectilinear motion on an uneven road surface, so as to generate a non-null acceleration on the hubs of the wheels, and the semi-active control system of the suspension provides the solenoid valves of the shock absorbers only with currents calculated in feedback on the basis of the Skyhook control model, with the aim of controlling the vertical dynamics of the body and the wheel hubs. It should be noted that this particular operating condition is easily identifiable in real time by a suspension control system including a processing module coupled to an on-board CAN bus through which a vehicle lateral dynamics control unit and/or vehicle lateral dynamics sensors such as yaw and lateral acceleration sensors are in communication.

Performance degradation of one or more shock absorbers is deduced by comparison with a predetermined nominal correlation between the road severity index and the nominal mean driving current of the control valve of a shock absorber, for example derived from a direct measurement of the damping characteristic F/v of the shock absorber as a function of the driving current of the control valve carried out on the bench, as a function of the tuning of the vehicle's control logic.

Further features and advantages of the invention will be described in greater detail in the following detailed description of an embodiment thereof, given by way of non-limiting example, with reference to the accompanying drawings.

DETAILED DESCRIPTION

Figure 1:
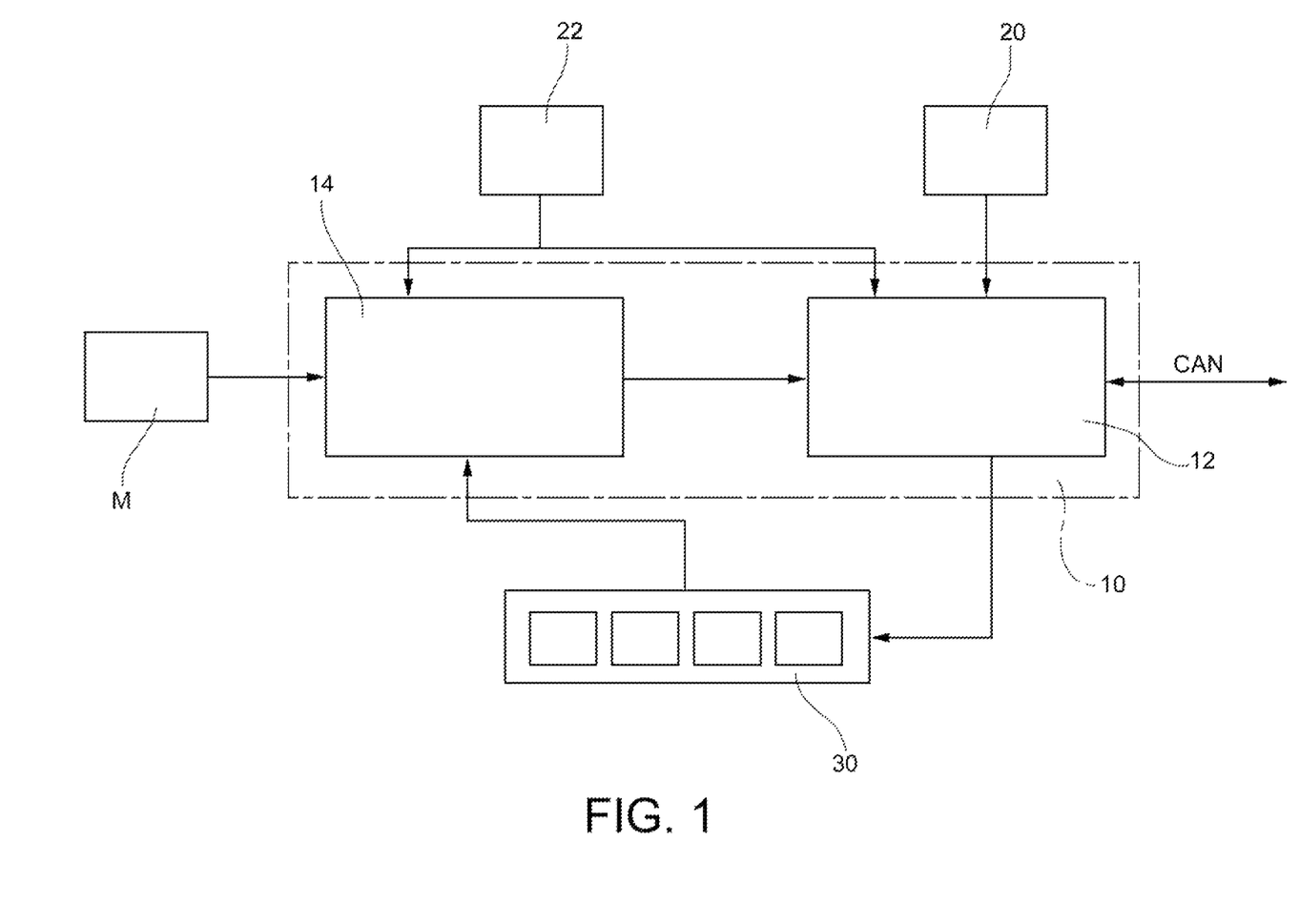
FIG. 1 is a schematic representation of the control architecture of an active or semi-active suspension system, arranged to estimate the degradation of the damping characteristics of shock absorbers.

With reference to the block diagram in FIG. 1, the control architecture of an active or semi-active suspension system according to the present invention is shown schematically.

A control unit 10 of the system comprises a control strategy processing module 12, designed to select one of a plurality of predefined control strategies as a function of the detected conditions of the road surface, the lateral dynamics of the vehicle, the damping characteristic model set and/or desired by the user, according to predetermined priority rules to keep the vehicle running in a safe condition.

The processing module 12 is coupled to sensor assemblies 20, 22 (generally including accelerometers), respectively coupled to the vehicle body and wheel hubs on at least one vehicle axle, preferably the front axle, adapted to detect relative acceleration or relative movement between the vehicle body and the wheel hub. Preferably, the sensor assembly 20 comprises three sensors coupled to the vehicle body to evaluate the chassis motions, for example, two sensors may be positioned on the front axle at the suspension domes and one sensor may be positioned on the rear axle. The sensor assembly 22 comprises at least two sensors arranged on the hubs of the front wheels (whereby the accelerations on the rear wheels are estimated) or a number of sensors corresponding to the number of wheels of the vehicle.

The processing module 12 is also coupled to an on-board CAN bus through which other on-board control units are in communication, typically an engine control unit, a transmission control unit, a longitudinal dynamics control unit of the vehicle arranged for managing ABS, EBD, ASR functions during braking or accelerating, a lateral dynamics control unit of the vehicle arranged for managing steering maneuvers, and a control unit for passenger compartment and body devices, commonly referred to as a "body computer".

In an improved embodiment, a user interface (not shown) may also be provided for the acquisition of commands for setting the desired behavior characteristic of the suspension system as a whole (comfort, sport) and/or the display of information on the operating status of the system, for example by means of a warning light for a detected fault condition.

Finally, at 30 are indicated collectively the adjustment valves of the damping characteristics of the shock absorbers, which are individually controlled by the processing module 12.

At 14 is indicated an estimator processing module for estimating the conditions of performance degradation of the shock absorbers integrated in the control unit 10.

The estimator module 14 is coupled at the input with the sensor assembly 22 comprising a pair of accelerometers coupled to the hubs of the front wheels of the vehicle (in this case an estimate is made of the accelerations of the rear wheel hubs) or a plurality of accelerometers respectively coupled to the hubs of the front and rear wheels of the vehicle and with the driving electronics of the control valves of the characteristics of the shock absorbers 30.

The estimator module 14 is further coupled in reading and writing with a memory module M to store a mathematical reference model indicative of the nominal relation between a road severity index RSI, related to vertical acceleration values (conveniently filtered and averaged) experienced by the wheel hubs, preferably the front wheels, for example, through predetermined analytical relationships, and a quantity I representative of the driving current of the control valves of the individual shock absorbers, for example, derived from a direct measurement of the damping characteristic F/v of a shock absorber as a function of the driving current of the control valve carried out on the bench, as a function of the tuning of the vehicle's control logic.

The reference model may be an analytical relationship between, or a map of numerical values in bijective correspondence of, the road severity index and the nominal mean driving current of the control valve of at least one shock absorber measured on the bench with reference to the damping characteristic F/v of the shock absorber, or an analytical relationship between, or a map of numerical values in bijective correspondence of, the road severity index and the mean driving current calculated for the shock absorbers during operation of the vehicle, on an actual road or on a test driving surface. Only the front shock absorbers or all shock absorbers may be considered. Behavior of the rear shock absorbers is estimated on the basis of the behavior of the front shock absorbers.

The mathematical reference model or history of the driving current means may be represented, for a given type of shock absorber, in the form of a map of numerical values of the indicated quantities in bijective correspondence. Alternatively, this model may be a dynamic mathematical model of the relationship between the indicated quantities.

The operating condition in which degradation of shock absorbers is estimated preferably corresponds to rectilinear travel of the vehicle on an uneven surface, i.e. such as to generate a non-null acceleration on the hubs of the wheels, in which control of the damping curve of the shock absorbers takes place in feedback on the basis of the Skyhook control model. This operating condition is easily identifiable by the control unit of the semi-active suspension system on the basis of the CAN signals it receives from the other vehicle dynamics control units and on the basis of the hub and body accelerometer sensors (FIG. 1). This particular operating condition will be referred to as the "condition of verification".

Figure 2:
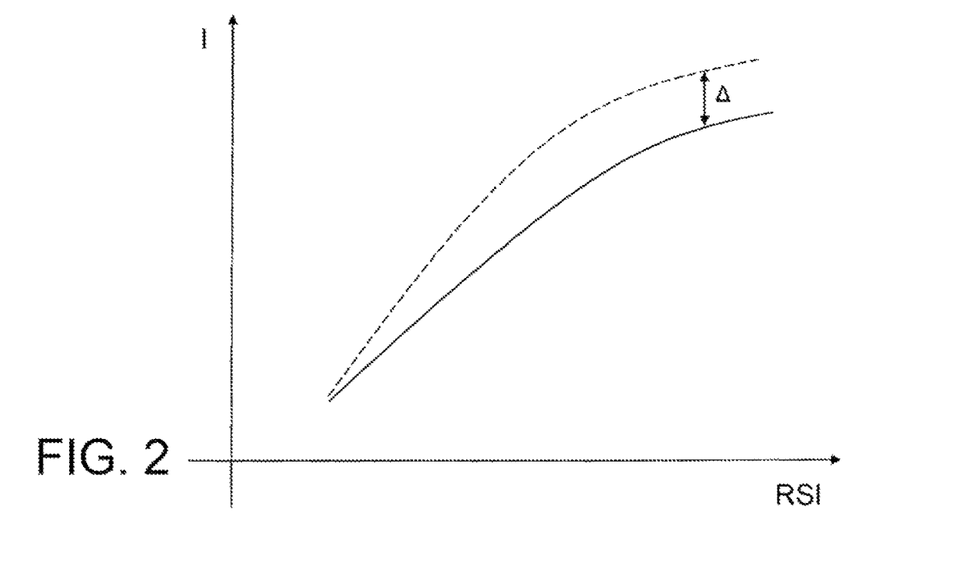
FIG. 2 is a diagram indicating the relationship between a value representative of the driving current of a control valve of a shock absorber and a road surface severity index, in a nominal operating condition of the shock absorber and in a degraded operating condition.

The estimator module 14 is connected to the processing module 12 to provide signals or data Δ indicative of the deviation between the nominal value and the actual value of the quantity representative of the driving current of the control valves of the shock absorbers and thus indicative of any degradation of the particular shock absorber considered. FIG. 2 shows with a dashed line the relationship curve between the current road severity index and the actual value of the quantity I, which is representative of the driving current of the control valve of the shock absorber considered. The distance of this present curve from the nominal curve represented as a dashed line in FIG. 2 is an indication of the current degradation of the operating characteristics of the shock absorber.

The estimator module 14 is arranged to execute a computer program or group of programs, for example stored locally, adapted to carry out the described method (algorithm) for estimating the degradation conditions of the performance of the shock absorbers.

Purely by way of example, the description of a method for estimating the degradation of the characteristic of a shock absorber is provided.

An adjustable damping shock absorber of the semi-active suspension control system is considered. A mathematical reference model indicative of the nominal relation between the road severity index RSI and the quantity I representative of the moving average of the driving current of the control valve of a shock absorber for different known and characterized degradation conditions of the shock absorber is represented by the graph in FIG. 3. In the graph, N indicates the nominal relation curve between the RSI and I indices in non-degraded operating conditions, while D1, D2, D3 and D4 indicate other curves representative of the relationship between the RSI and I indices in the different known and characteristic degraded conditions of the shock absorber. Each of the degradation conditions is associated with a synthetic degradation index Δi, with i=1, 2, 3, 4.

Figure 4:
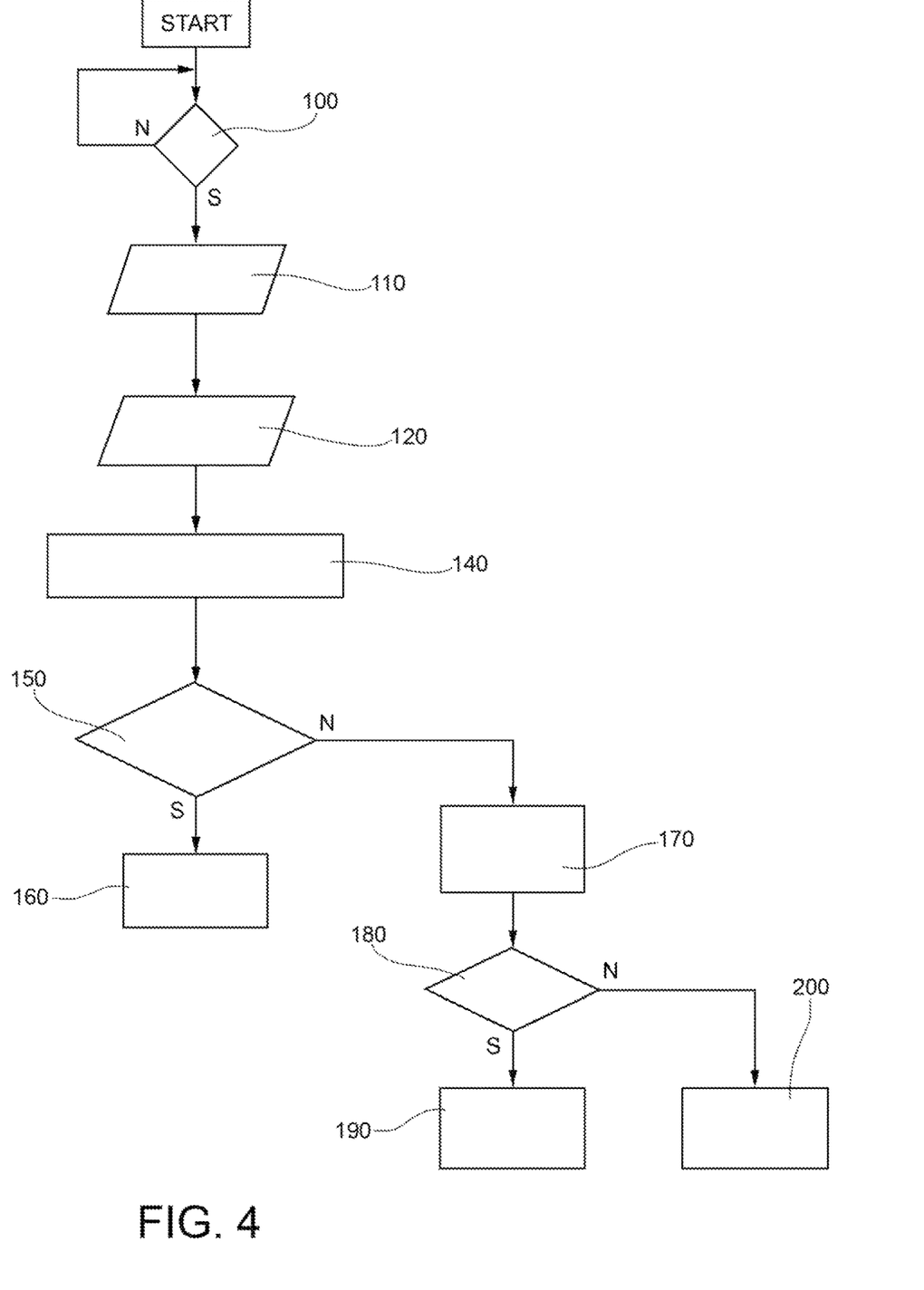
FIG. 4 is a flow diagram of a method for estimating the degradation of damping characteristics of the shock absorbers according to the present invention.

With reference to the flow diagram in FIG. 4, during motion of the vehicle, the control unit 10 of the suspension system determines in step 100 whether an operating condition of verification, previously defined as a condition of rectilinear travel on an uneven surface, exists.

If this is the case, in step 110 the estimator module 14 acquires the respective acceleration data from the accelerometer sensors 22 of the shock absorbers (e.g. front shock absorbers).

Subsequently, in step 120, the estimator module 14 acquires a respective mean driving current value of the control valve of each shock absorber for which the degradation (i.e., of the front and rear shock absorbers) determined through the Skyhook control model implemented in the processing module 12 is estimated.

Figure 3:
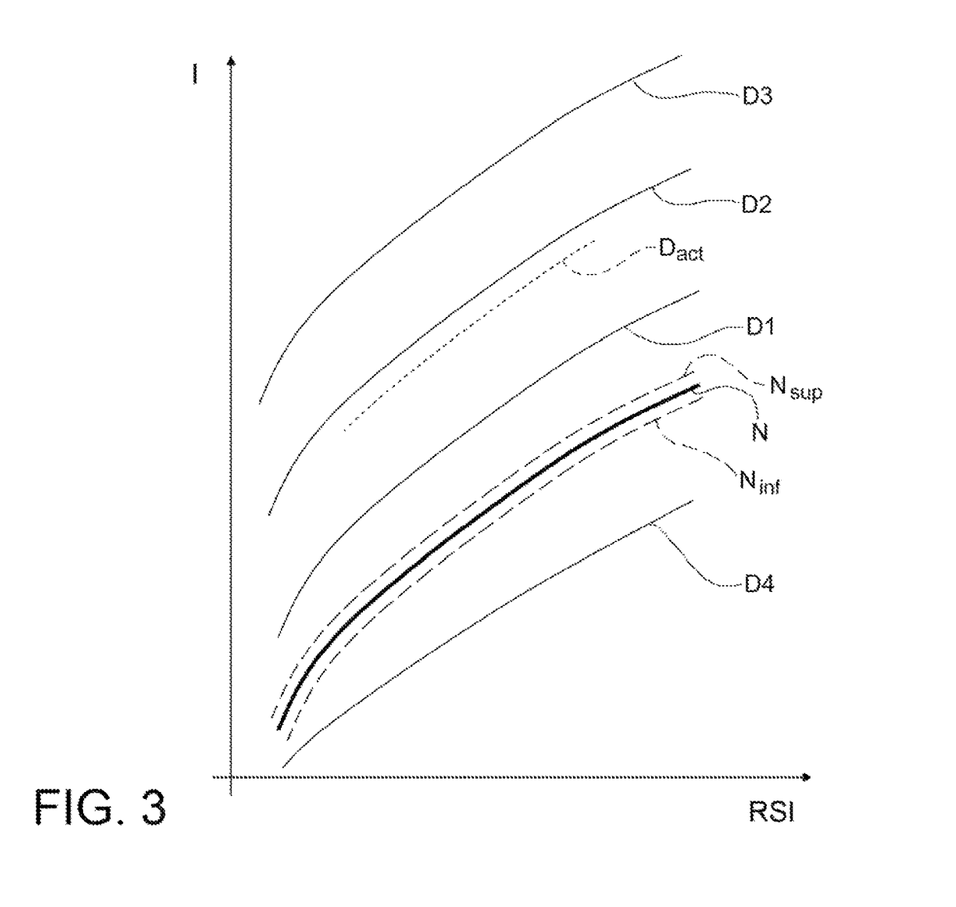
FIG. 3 is a diagram showing the relationship between a representative value of the driving current of a control valve of a shock absorber and a road surface severity index, in a plurality of different degraded operating conditions.

Then, in step 140, the estimator module 14 determines a road severity index (RSI) based on the vertical accelerations measured by the accelerometric sensors located at the front wheel hubs, and, through the reference model indicative of the nominal relation between the road severity index RSI and the mean driving current I of the control valve of each shock absorber, it determines the respective expected driving current or, preferably, an expected driving current range between a lower threshold value and an upper threshold value (represented in FIG. 3 by the $N_{inf}$ and $N_{sup}$ curves).

In step 150, the estimator module 14 checks whether the mean driving current value of the control valve of each shock absorber, acquired through the Skyhook control model, is between said lower threshold value $N_{inf}$ and said upper threshold value $N_{sup}$. If this is the case, the estimator module concludes that there is no degradation of the shock absorber at step 160. If not, the estimator module detects a possible degradation condition and in step 170 identifies the shock absorber for which the driving current of the respective control valve is not consistent with the expected one, i.e. it exceeds the predetermined threshold values $N_{inf}$ or $N_{sup}$.

In step 180 the estimator module 14 calculates the current deviation from the present driving current that is required to restore a correct operation of the shock absorber, and verifies whether the current deviation results in a correct driving current necessary to achieve the Skyhook force desired for the shock absorber, greater than the maximum current delivered or less than the minimum current actuating the control valve, i.e. whether this change exceeds the maximum possible compensation of the degradation.

In the affirmative case, in step 190 the estimator module 14 sends an alarm signal indicating the presumed degradation of the shock absorber to the user in the form of a visual signal on a screen or a signal indicating an operating condition of the shock absorber stored in an operation log of the vehicle. In the negative case, at step 200 the estimator module 14 sends a degradation compensation signal to the control processing module 12, modifying the control parameters of the control valve of the shock absorber. The degradation compensation signal will be in the form of a current difference (which could be either negative or positive) to be added to the driving current of the control valve as defined by the processing module 12 of the control strategy (which does not act by feedback).

The verification carried out in step 150 is best illustrated with reference to FIG. 3, wherein a degradation operating condition of a shock absorber is illustrated, represented by a relationship between the RSI and I indices as represented by the curve $D_{act}$.

Advantageously, the verification at step 150 comprises the following operations. For the entire duration of the condition of verification, the distance between the curve $D_{act}$ and the curves D1-D4 representative of the different known and characterized degradation conditions of the shock absorber, shown in FIG. 3, is calculated. This distance is preferably quantified by calculating the root mean square between the curve $D_{act}$ and each of the curves D1-D4, over the duration of the condition of verification. It is assumed that the curve $D_{act}$ is closer to the curve D2. Therefore, it is deduced that the shock absorber is degraded, with the amount of degradation expressed by the predetermined synthetic index Δ2.

Preferably, the aforesaid comparison is repeated a predetermined number of times, as appropriate, under subsequent conditions of verification. Under each of these conditions of verification, a degradation index Δi is calculated, and the current degradation index Δ is calculated by averaging the individual degradation indexes Δi with predefined weights. The weights of the individual degradation indices are preferably calculated on the basis of the reliability of the curves representing the relationships between the RSI and I indices in the different degradation conditions. For example, a curve obtained over a trip of longer duration and/or distance and with a greater range of RSI will have a greater weight than a curve obtained over a trip of shorter duration and/or distance and with an almost constant RSI index.

Advantageously, the entire estimation process described above is repeated at regular intervals, to periodically update the estimation of the degradation index Δ of the shock absorber.

Advantageously, the data element Δ indicative of the estimated degradation of the performance of a shock absorber (or suspension system as a whole) may be used by the control module of the suspension system and possibly by other modules connected to the CAN network to make decisions and implement a corresponding change in the control current of the characteristics of the shock absorbers depending on the strategy used. This makes it possible to adapt the behavior of the suspension system to the degradation (as long as sustainable) of the shock absorbers, so that passengers do not perceive a change in absolute driving comfort, the comfort settings desired by the driver and the dynamic performance of the vehicle.

In the event that the degradation of the shock absorbers is no longer recoverable, because it is excessive compared to the preset tolerance bands, the system is arranged to alert the driver indicating it is time to visit a garage for overhaul of the entire suspension system or replacement of a specific shock absorber.

The principle of the invention remaining unchanged, the embodiments and the details of implementation may be greatly modified with respect to those described and illustrated purely by way of a non-limiting example, without thereby departing from the scope of protection as described and claimed herein.

The invention claimed is:

1. A method for estimating damping characteristics of shock absorbers of a vehicle in an active or semi-active suspension system comprising:
   a plurality of adjustable damping shock absorbers, each shock absorber including a pressure chamber containing a damping fluid, a piston being slidable inside said pressure chamber, the position of which defines a lower pressure chamber and an upper pressure chamber, a by-pass chamber in communication with the upper pressure chamber, and at least one control valve, arranged to control passage of the damping fluid between the pressure chamber and the by-pass chamber;
   sensors detecting relative acceleration or relative movement between a vehicle body and each wheel with which a shock absorber is associated, and accelerations and movements of the vehicle body; and
   an electronic processing and control unit, adapted to receive signals indicative of said relative acceleration or said relative movement, and arranged to emit driving signals of control valves of the shock absorbers to achieve predetermined damping characteristics of the shock absorbers,
   the method comprising:
      providing a reference model indicative of a nominal relation between a road severity index, RSI, related to vertical acceleration values experienced by wheels of the vehicle while driving on a road section, and a quantity representative of a magnitude of a driving force of the control valves of the shock absorbers;
      acquiring respective relative acceleration or speed data of at least the front wheels of the vehicle with respect to the vehicle body;
      determining a value of the road severity index starting from said relative acceleration or speed data of the front wheels of the vehicle with respect to the vehicle body;
      acquiring values of a quantity representative of the magnitude of the driving force of the control valve of each shock absorber;
      for at least one shock absorber, comparing an acquired value of said quantity representative of the magnitude of the driving force with an expected value of said quantity representative of the magnitude of the nominal driving force determined as a function of said road severity index according to said reference model; and
      determining a degradation condition of a shock absorber if the acquired value of the respective magnitude of the driving force does not correspond to said expected value of the magnitude of the nominal drive force.

2. The method as set forth in claim 1, wherein said quantity representative of the magnitude of the driving force of the control valve of a shock absorber is a quantity representative of the driving current of said control valve.

3. The method as set forth in claim 2, wherein said quantity representative of the driving current of the control valve of a shock absorber is the mean driving current of said control valve in a predetermined time interval.

4. The method as set forth in claim 1, wherein the method is carried out in an operating condition of verification in which the vehicle travels in a rectilinear motion on an uneven surface.

5. The method as set forth in claim 4, wherein said semi-active suspension system of the vehicle drives the control valves of the shock absorbers through driving currents calculated in feedback on the basis of a Skyhook control model.

6. The method as set forth in claim 1, wherein said reference model is indicative of a plurality of nominal relations between the road severity index and the quantity representative of the magnitude of the driving force of the control valves of the shock absorbers for different known and characterized degradation conditions of a shock absorber.

7. The method as set forth in claim 1, comprising for at least one shock absorber calculating a deviation between the acquired value of said quantity representative of the magnitude of the driving force and the expected value of said quantity representative of the magnitude of the nominal driving force, and checking whether said deviation exceeds a maximum deviation threshold corresponding to a magnitude value of a non-deliverable driving force, the method further comprising:
  if said deviation exceeds the maximum deviation threshold, emitting an alarm signal; and
  if said deviation does not exceed the maximum deviation threshold, emitting a compensation signal to modify the magnitude of the driving force of the control valve of said shock absorber.

8. The method as set forth in claim 1, wherein comparing the acquired value of said quantity representative of the magnitude of the driving force with the expected value of said quantity representative of the magnitude of the nominal driving force determined as a function of said road severity index according to said reference model is implemented for a plurality of nominal relations between the road severity index and the quantity representative of the magnitude of the driving force of the control valves of the shock absorbers associated with different known and characterized degradation conditions of the shock absorber, comparison being performed a plurality of times during an operating condition of verification.

9. The method as set forth in claim 8, wherein comparing the acquired value of said quantity representative of the magnitude of the driving force with the expected value of said quantity representative of the magnitude of the nominal driving force for a plurality of nominal relations comprises calculating a root mean square between an acquired value of a mean driving current and an expected value of a nominal mean driving current for said plurality of nominal relations, and marking said shock absorber with a predetermined degradation index associated with the expected value of the nominal mean driving current to which said acquired value of the mean driving current is closer.

10. The method as set forth in claim 9, wherein comparing the acquired value of said mean driving current with the expected value of the nominal mean driving current is carried out for a predetermined number of successive occurrences of the operating condition of verification, the method further comprising marking said shock absorber with a predetermined present degradation index calculated by averaging, with predefined weights, degradation indexes marking said shock absorber during a preset number of successive occurrences of the operating condition of verification.

11. The method as set forth in claim 1, wherein said reference model is an analytic relationship between, or a map of numerical values in bijective correspondence of, the road severity index and the nominal mean driving current of the control valve of at least one shock absorber, measured on a bench with reference to the damping characteristics of the shock absorber.

12. The method as set forth in claim 1, wherein said reference model is an analytic relationship between, or a map of numerical values in bijective correspondence of, the road severity index and mean driving current calculated for the shock absorbers during operation of the vehicle.

13. The method as set forth in claim 3, wherein values of the quantity representative of the driving current of the control valve of each shock absorber are correlated to actual mean driving current of said control valve according to a predetermined filtering rule.

14. The method as set forth in claim 13, wherein said predetermined filtering rule comprises a first-order filter and a moving average over pre-determined time intervals.

15. The method as set forth in claim 1, wherein said expected value of magnitude of the nominal driving force is a value comprised between a lower threshold value and a higher threshold value.

16. The method as set forth in claim 1, wherein said sensors include at least one accelerometer coupled to the vehicle body and at least one pair of accelerators coupled to respective hubs of the front wheels of the vehicle.

17. A system for estimating damping characteristics of shock absorbers of a vehicle in an active or semi-active suspension system comprising:
  a plurality of adjustable damping shock absorbers, each shock absorber including a pressure chamber containing a damping fluid, a piston being slidable inside said pressure chamber, the position of which defines a lower pressure chamber and an upper pressure chamber, a by-pass chamber in communication with the upper pressure chamber, and a control valve, arranged to control passage of the damping fluid between the pressure chamber and the by-pass chamber;
  sensors detecting relative acceleration or relative movement between a vehicle body and each wheel with which a shock absorber is associated, and accelerations and movements of the vehicle body; and
  an electronic processing and control unit, adapted to receive signals indicative of said relative acceleration or said relative movement, and arranged to emit driving signals of control valves of the shock absorbers to achieve predetermined damping characteristics of the shock absorbers,
  the system comprising a processing module estimating degradation conditions of the shock absorbers, coupled at an input with said sensors and at an output with said electronic processing and control unit, arranged to perform a method comprising:
  providing a reference model indicative of a nominal relation between a road severity index, RSI, related to vertical acceleration values experienced by wheels of the vehicle while driving on a road section, and a quantity representative of a magnitude of a driving force of the control valves of the shock absorbers;
  acquiring respective relative acceleration or speed data of at least the front wheels of the vehicle with respect to the vehicle body;
  determining a value of the road severity index starting from said relative acceleration or speed data of the front wheels of the vehicle with respect to the vehicle body;

acquiring values of a quantity representative of the magnitude of the driving force of the control valve of each shock absorber;

for at least one shock absorber, comparing an acquired value of said quantity representative of the magnitude of the driving force with an expected value of said quantity representative of the magnitude of the nominal driving force determined as a function of said road severity index according to said reference model; and determining a degradation condition of a shock absorber if the acquired value of the respective magnitude of the driving force does not correspond to said expected value of the magnitude of the nominal drive force.

18. An active or semi-active suspension system for a vehicle, comprising a system for estimating damping characteristics of shock absorbers of a vehicle according to claim 17.

19. A non-transitory computer readable medium storing a computer program or group of computer programs executable by a computer system, comprising one or more code modules for implementing a method for estimating damping characteristics of shock absorbers of a vehicle in a semi-active suspension system according to claim 1.

* * * * *